United States Patent [19]

Steffens

[11] Patent Number: 5,035,590

[45] Date of Patent: Jul. 30, 1991

[54] DOUBLE-SHAFT VACUUM PUMP WITH SYNCHRONIZATION GEARS

[75] Inventor: Ralf Steffens, Köln, Fed. Rep. of Germany

[73] Assignee: Leybold Aktiengesellschaft, Köln, Fed. Rep. of Germany

[21] Appl. No.: 481,746

[22] Filed: Feb. 15, 1990

Related U.S. Application Data

[62] Division of Ser. No. 167,159, Mar. 11, 1988, abandoned.

[30] Foreign Application Priority Data

Mar. 13, 1987 [EP] European Pat. Off. .......... EP 87103

[51] Int. Cl.⁵ .................. F04C 18/18; F04C 29/02; F04C 29/04; F16H 55/08
[52] U.S. Cl. ..................... 418/206; 74/462; 184/6.12; 184/6.16
[58] Field of Search ............. 74/460, 462; 184/6.12, 184/6.16; 418/83, 205, 206

[56] References Cited

U.S. PATENT DOCUMENTS

| | | | |
|---|---|---|---|
| 1,192,287 | 7/1916 | Easton | 418/83 |
| 1,194,904 | 8/1916 | Wagner | 74/462 |
| 1,506,918 | 9/1924 | Fraunhofen | 74/462 |
| 1,852,789 | 4/1932 | Peterson . | |
| 2,519,557 | 8/1950 | Flanagan | 418/206 X |
| 2,737,057 | 3/1956 | Van Dorn et al. . | |
| 3,121,530 | 2/1964 | Lorenz . | |
| 3,269,205 | 8/1966 | Niemann | 74/462 |
| 3,438,279 | 4/1969 | Rouverol . | |
| 3,990,539 | 11/1976 | Marit | 184/6.12 |

FOREIGN PATENT DOCUMENTS

| | | |
|---|---|---|
| 1225459 | 9/1966 | Fed. Rep. of Germany . |
| 3344953 | 6/1985 | Fed. Rep. of Germany . |
| 244095 | 3/1947 | Switzerland . |
| 304481 | 3/1955 | Switzerland . |

Primary Examiner—Michael Koczo
Attorney, Agent, or Firm—Spencer & Frank

[57] ABSTRACT

A double-shaft vacuum pump with pistons (3,4) rotating without contact in the pump chamber (8) and with synchronization gears (16, 17) located in a side chamber (15). In order to dispense with an oil supply in the side chamber the teeth of the synchronization gears (16, 17) are shaped in such a way that contact between the tooth flanks (26) is limited to the immediate vicinity of the pitch circle (29). If any lubrication is needed, it can be supplied by bearing grease suitable for vacuum applications. The side chamber cover (27) is preferably shaped as a "figure-8" to conform to the peripheries of the synchronization gears (16, 17), and a cooling system for the gears may be provided.

22 Claims, 3 Drawing Sheets

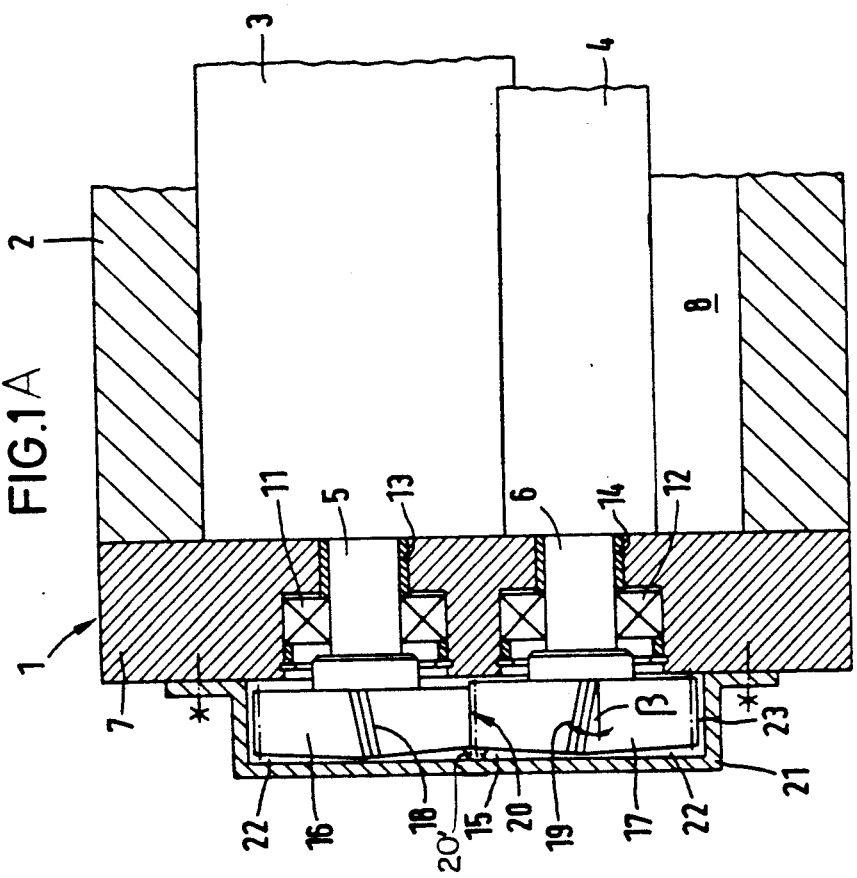

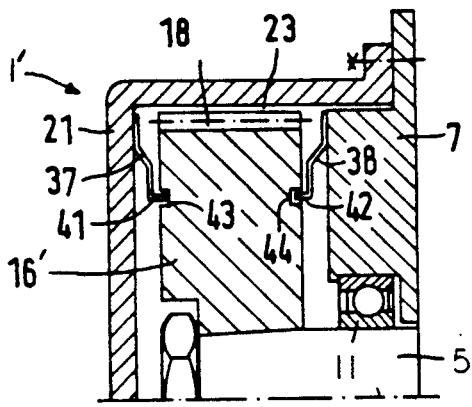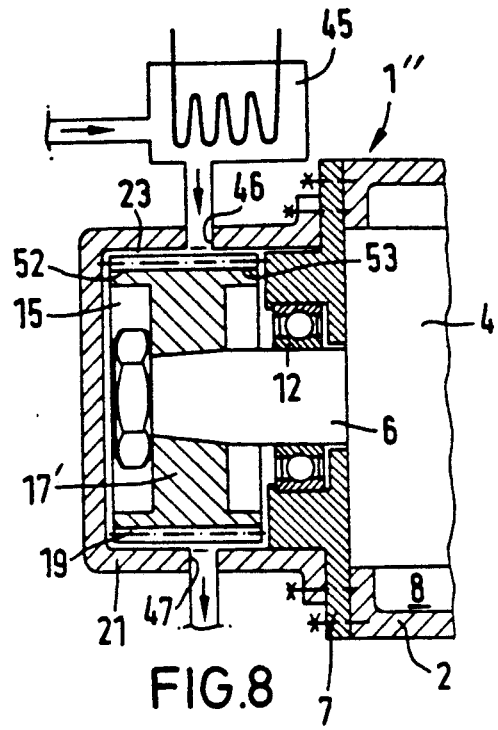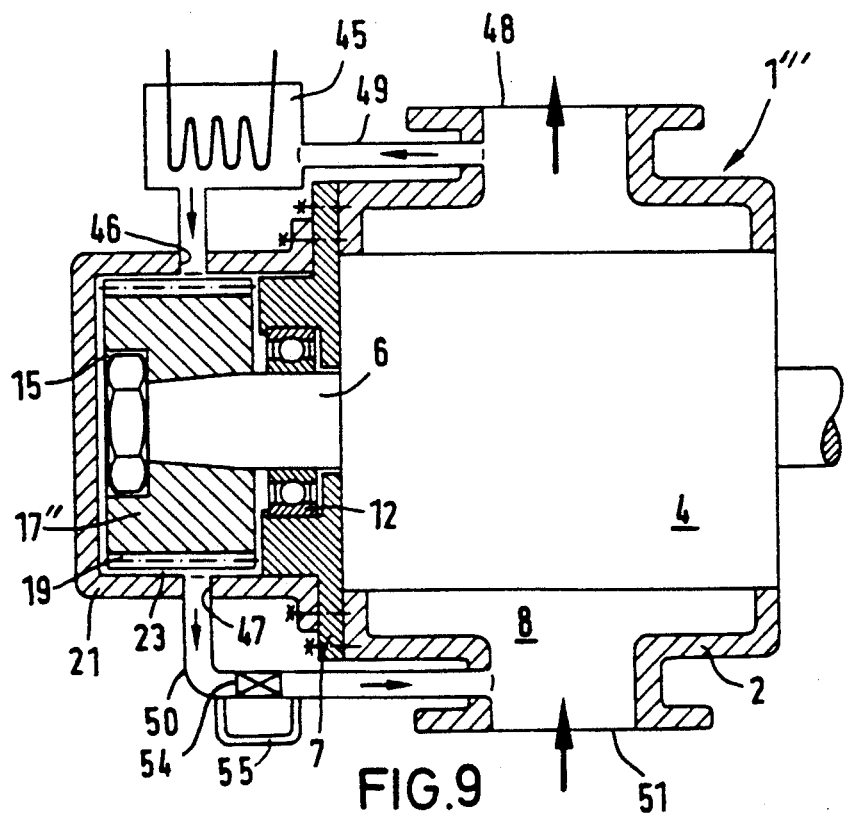

DOUBLE-SHAFT VACUUM PUMP WITH SYNCHRONIZATION GEARS

This application is a division of application Ser. No. 07/167,159, filed Mar. 11, 1988, abandoned.

BACKGROUND OF THE INVENTION

The present invention relates to a double-shaft vacuum pump with pistons rotating without contact in a pump chamber and with two synchronization gears located in a side chamber.

A typical example of a double-shaft vacuum pump is a Root's pump, in which two symmetrically designed pistons rotate in a pump housing without contact with each other or with the housing. The two pistons have approximately "figure-8" cross sections. Their movement is synchronized by gearing normally consisting of two synchronization gears. The gearing is housed in a side chamber which is separated from the pump chamber of the Root's pump by an end shield. The shafts extend through the end shield and generally are supported by ball bearings. The synchronization gears are fixed on the shaft ends extending into the side chamber. Normally, lubrication of the synchronization gears and bearings is done by oil present in the side chamber, the oil being swirled around by means of a centrifugal disk. Furthermore, Northey pumps, helical compressors, etc., which can also be used as vacuum pumps, belong to the double-shaft group of machines.

Double-shaft vacuum pumps of the type mentioned above have the advantage that there is no friction in the pump chamber, so that the pump chamber can be kept free of lubricants. For this reason they are particularly suitable for use with pumping media which must be kept free of carbon-containing contaminants. An important prerequisite for this is effective seals at the feed-through of the shafts into the oil-containing side chamber. Normally, piston ring seals are used as seals between the side chamber and the pump chamber. These as well as other known pump chamber seals, for example rotary shaft seals or rotating mechanical seals, do not present satisfactory solutions for the double-shaft vacuum pump, i.e. an assured seal between the pump chamber and the side chamber with the gearing so as to continuously assure an absolutely dry (i.e. oil-free) pump chamber.

It is known from German Laid-open Patent Application DE-OS 3,344,953 to evacuate the side chambers of a Root's pump in order to thereby maintain a slight flow of the pumping medium, in the area of the shaft seals, directed towards the side chambers. Such measures are expensive. Furthermore, such measures cannot be used in connection with corrosive or toxic pumping media.

SUMMARY OF THE INVENTION

It is an object of the present invention to provide a double-shaft vacuum pump of the type previously discussed having synchronization gears which do not require an oil supply.

This object can be attained, in accordance with the present invention, by providing synchronization gears having teeth that are configured in such a way that contact between the surfaces of the teeth is limited to the immediate vicinity of the pitch circle. In synchronization gearing designed in this manner, the distance between the pitch point and the contact point farthest away is very small. Movement between two touching tooth surfaces composed of sliding and pitch portions is in this way generally limited to the pitch area, i.e. the sliding motions which occur are minimal. Since in general oil lubrication is required only due to sliding motion of gears, it is possible to dispense with the use of a lubricant in connection with synchronization gearing designed according to the invention, or at least not to use oil as a lubricant. Thus the danger of oil or oil vapors penetrating into the pumping chamber through the shaft seals in the end shield is no longer present, since the piston lubrication is also accomplished without lubricating oil; bearings lubricated with grease are the rule.

Very different steps can be taken to achieve the goal of a limitation of the contact between the flanks of the teeth of the synchronization gears in the immediate vicinity of the pitch circle. For example, on at least one of the synchronization gears the head and/or the foot area of the flanks of the teeth can be set back a suitable distance in comparison to the standard shape of a tooth profile. Furthermore both synchronization gears can have—again in comparison with the standard shape of a tooth profile— considerably reduced tooth heights. In a particularly advantageous embodiment, the effective tooth height (that tooth height at which the flank of the tooth comes into contact with the flank of the opposite tooth) exceeds the pitch circle only by a small amount, for example by 1/100 to 2/5 of the modulus m of the gearing, which otherwise preferably is of standard shape. These steps can be taken individually or in combination.

Since the size of the range of the contact of the teeth cannot be freely reduced and depends on the force to be transmitted, further steps may be employed, if required, in which the danger of seizing is not precluded without lubrication with oil. Steps of this type could be in the form of a set-back of the profile of the teeth, preferably in the start of the bearing area. Another possibility lies in providing relatively resilient side areas of the synchronization gears. By taking steps of this type the danger of seizing at the time of the first interaction shock is reduced, i.e. the appearance of, in particular, chiseling sliding during first contact of the teeth with each other is minimized.

A further advantage arising from the present invention is that frictional movements, which might lead to temperature increases, are almost completely avoided due to the maximally reduced sliding speeds. In spite of this it might be appropriate to further reduce the temperature level, especially since normally losses occur at the pump which increase the temperature of the gear-tooth system. A practical way to further reduce the temperature level, if necessary, is to dispose the synchronization gears in a gas flow (inert and/or cooled). The gas flow can be branched off the feed stream of the pump or can be provided separately, for example with a cooling system. Cooling can also be provided by employing narrow spaces between the synchronization gears and the housing walls of the side chamber, so that heat dissipation is not hampered by great distances. Narrow spacing has the further advantage that the total dead space of the pump is reduced, i.e. the harmful backflow of gas from the side chamber is reduced. Finally, the entire structural size of the pump is smaller.

BRIEF DESCRIPTION OF THE DRAWINGS

FIG. 1A is a longitudinal sectional view through both shafts of a portion of a Root's pump in accordance with the present invention.

FIG. 1B is a cross sectional view through the pistons of the pump of FIG. 1B.

FIG. 2 is a cross sectional view taken through the side chamber cover and the synchronization gears of the pump of FIG. 1A.

FIG. 7 is a sectional view taken through a portion of another embodiment of a Root's pump in accordance with the present invention, and illustrates seals for retaining lubricating grease.

FIG. 8 is a longitudinal sectional view through a portion of a further embodiment of a Root's pump in accordance with the present invention, the section being taken through a plane at right angles to the sectional plane of FIG. 1A.

FIG. 9 is a longitudinal sectional view through a portion of still a further embodiment of a Root's pump in accordance with the present invention, the section being taken through a plane at right angles to the sectional plane of FIG. 1A.

DESCRIPTION OF THE PREFERRED EMBODIMENTS

Figure 3:
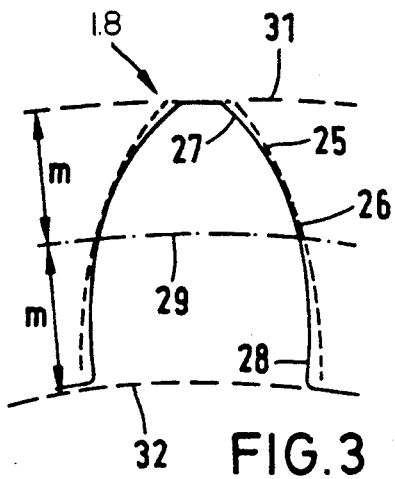
FIG. 3 is a side view illustrating the configuration of the teeth on the synchronization gears of the pump of FIG. 1A.

In connection with the Root's pump 1 shown in FIG. 1A, the housing ring has been designated with reference number 2 and the pistons rotating therein with 3 and 4. Pistons 3 and 4 are shown in cross section in FIG. 1B. The shafts 5 and 6 of the pistons 3 and 4 are supported in lateral end shields, of which only the left end shield 7 is shown. The housing ring 2 and the end shields comprise the pumping chamber 8 of the vacuum pump 1 shown.

The shafts 5 and 6 are supported by bearings 11 and 12 in the end shield 7. Schematically indicated shaft seals 13 and 14 are located between the bearings 11 and 12 and the pumping chamber 8, and separate the pumping chamber 8 from the side chamber 15.

The side chamber 15 is used for housing the synchronization gearing consisting of the synchronization gears 16 and 17. The gears 16 and 17 are fixed on the ends of the shafts 5 and 6. Synchronization gear 16 has teeth 18 (only one of which is shown in FIG. 1A) and synchronization gear 17 has the same number of teeth 19 (only one of which is shown in FIG. 1A). Teeth 18 mesh with teeth 19 at 20. The side chamber 15 is limited by the end shield 7 and a side chamber cover 21 fixed on the end shield 7.

As will be further described in detail below, the teeth 18 and 19 of the synchronization gears 16 and 17 are designed such that an oil supply is no longer required in the side chamber 15. In a particularly advantageous design, the teeth 18 and 19 have negligible sliding friction and the synchronization gears 16 and 17 can run completely dry. With a small amount of sliding friction still present, a relatively small supply of grease (bearing grease suitable for vacuum application) in the side chamber 15 is sufficient for greasing of the mesh point 20 and the bearings 11 and 12.

As will be apparent from FIG. 2, the side chamber 15 is considerably smaller than is required for a side chamber supplied with oil. The cover 21 is approximately in the shape of a "figure-8" and is adapted to the synchronization gears 16 and 17 in such a way that there are only narrow gaps 22 (axially) and 23 (radially) between the gears 16 and 17 and the housing cover 21. The grease which might be required is located in these spaces.

The outer ends of the gears 16 and 17 are cone-shaped in the embodiment of Root's pump 1 shown in FIG. 1, so that the width of the gears 16 and 17 decreases in the radial direction. As a result, the axial gap 22 is also cone-shaped The grease (illustrated schematically at 20') pushed away from the teeth 18 and 19 at the mesh point 20 is squeezed to the side surfaces of the gears 16 and 17 and is then moved back in the direction of the teeth because of centrifugal force.

Thus the grease fulfills two tasks: For one, it is used for lubrication of the point 20 where the teeth 17 and 18 mesh. Furthermore the grease that is pushed away laterally from the teeth in the direction of the side chamber cover 21 is used for dissipating heat from the synchronization gears 16 and 17 to the side chamber cover 21. If required, the heat dissipation of the cover 21 towards the outside can be improved by circulating air or cooled oil or directly with water.

Teeth 18 and 19 are inclined with respect to the axis of rotation of the respective synchronization gear. In practice the angle of inclination $\beta$ may range from 10° to 35°, and preferably approximately 20°. The turning direction is such that the grease is moved away from the pumping chamber 8 because of the turning of the synchronization gears 16 and 17 and the inclination of the teeth.

The configuration of a tooth 18, to provide a minimal amount of sliding with respect to an identically configured tooth 19, is shown in FIG. 3. The profile of tooth 18 has been changed in comparison with the shape of a standard tooth, which is shown with dashed lines and indicated by reference number 25. This standard shaped tooth is an involute tooth having flanks of a known configuration for a predetermined tooth thickness. The flanks 26 of tooth 18 are recessed in the head area 27 and the foot area 28 in comparison with the standard shape (dashed lines 25) so that the meshing teeth do not touch in the areas 27 and 28. The meshing teeth are only in contact in the area of their pitch circle 29. There are no distant points of interaction where sliding friction occurs. In this way sliding friction is minimized. In addition, the head and base circle are drawn in FIG. 3 and designated by reference numbers 31 and 32. The gear-tooth system is characterized by the modulus m. The pitch circle 29 is distant by the modulus amount m from the base circle 32 and the head circle 31 in the standard gear-tooth system. The foot circle and the said base circle 32 are different by the amount of the so-called "head clearance."

As was mentioned above the meshing teeth contact one another only in the region of the pitch circle 29, and not along the entire flank 26. The length of the contact region is less than 20% of the length of flank 26, from base circle 32 to head circle 31, and preferably less than 10% of the length of flank 26. A contact region having a length less than 5% of the length of flank 26 is better still.

Figure 4:
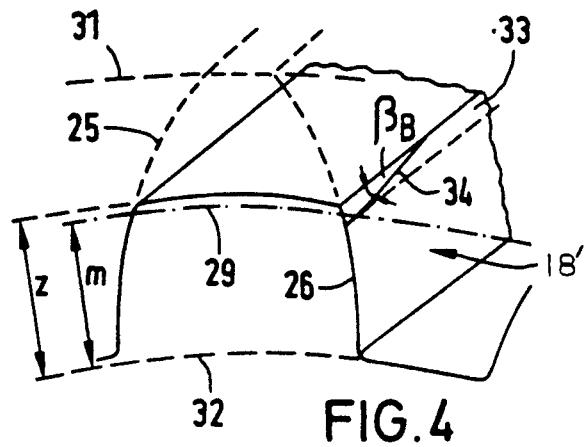
FIG. 4 is a perspective view illustrating an alternative configuration for the teeth on the synchronization gears of the pump of FIG. 1A.

Instead of teeth 18 (and 19) as illustrated in FIG. 3, teeth 18' as shown in FIGS. 4 and 5 can be employed to provide a minimal amount of sliding with respect to identically configured teeth 19'. In FIG. 4, the tooth 18' has a tooth profile with a greatly reduced tooth height z in comparison to the standard shape 25. The tooth height z is only minimally larger than the standard modulus m, namely by 1/100 to 2/5 of the modulus value m. This results in a very narrow support area 33 in which sliding motions are negligible. As is shown, the support area 33 is located adjacent the top lane of the tooth. Since this is an inclined gear-tooth system, the contact lines extend obliquely through the support area 33 (line of contact 34). The angle between the contact line 34 and the lines delimiting the support area 33 is designated by $\beta_B$.

Figure 5B:
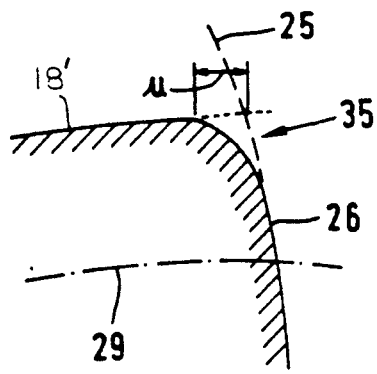
FIG. 5B is a sectional view of a portion of a tooth having the alternative configuration of FIG. 4, and illustrates a rounded region which provides a profile set-back.
Figure 5A:
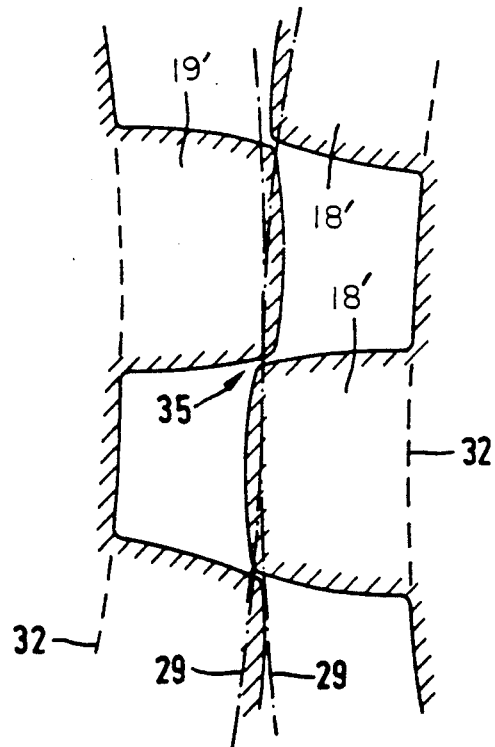
FIG. 5A is a sectional view illustrating the meshing of teeth on synchronization gears, the teeth having the alternative configuration of FIG. 4.

FIG. 5A shows synchronization gears in the meshed state, the gears having a tooth profile in accordance with FIG. 4. In a gear system of this type having teeth with a theoretical involute shape, a so-called "first interaction push" might occur each time the teeth mesh, which is characterized by a movement of the tooth flanks in the form of "chiseling" or "pushing sliding." To soften this first interaction shock a correction in the profile is provided for teeth 18' (and 19') as shown in FIG. 5b. The correction consists of a minimal profile set-back 35, preferably only in the beginning of the support area 33 (see FIG. 4), and is shown enlarged in FIG. 5b. In FIG. 5b the flank profile of a standard tooth has again been designated by reference number 25 and the pitch circle by reference number 29. The setback 35 of the head is performed by setting back the actual course of the tooth flank 26 at the head circle by the value $\mu$, as compared with the standard shape 25, and then gradually (in a mathematical sense without a point of discontinuity, or abrupt transition of the tangent) returning to the standard involute form 25 again. The value of $\mu$ may lie between 2 and 10 $\mu$m, and preferably at approximately 4 $\mu$m.

Figure 6:
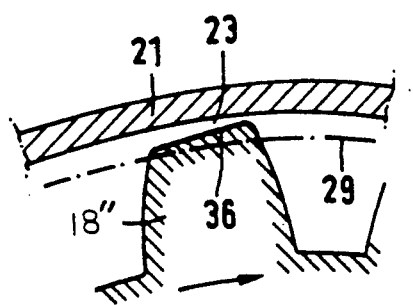
FIG. 6 is a sectional view through a portion of a side chamber cover and a portion of a synchronization gear having teeth with another modified configuration.

The tooth 18" shown in FIG. 6 is similar to tooth 18' but has an inclined head surface 36. The inclination of the head surface 36 has been selected so that the leading edge of the head surface 36 is higher than the trailing edge. Because of this the friction between the head surface 36 and the grease (not illustrated) present in the gap 23 is decreased. Nevertheless, pick-up of the grease for the purpose of lubrication and for the purpose of heat dissipation is assured. The grease scraped of the front edges of the head surface 36 provides lubrication between the flanks which touch and is forced into available open spaces. Preferably these are the areas between the bases of the teeth. After the teeth have meshed, the grease is transferred again to the outer, cooler circle of grease because of centrifugal force and thus dissipates the heat from the head of the tooth to the cooled housing surface 21.

FIG. 7 illustrates a portion of a Root's pump 1' in which steps have been taken to limit the space in which the grease (not illustrated) is contained (preferably in the radial gap 23). For this purpose profiled rings 37 and 38 have been provided on both sides of the synchronization gear 16' (similar profiled rings, not illustrated, are of course used with the other synchronization gear of pump 1'). One rim of ring 37 is fastened on the side chamber cover 21 and one rim of ring 38 is fastened on the end shield 7. The free rims 41 and 42 are each angled in the direction towards the synchronization gear 16' and extend into grooves 43 and 44, which are shaped as annular rings on the gear 16'. By using gap seals of this type or by using similar, touching seals (not illustrated) it can be assured that the grease remains in the area of the teeth.

In the exemplary embodiments shown the total degree of overlap $\epsilon_{ges}$ of the gear-tooth system is in general determined by the overlap ratio $\epsilon_\beta$. In accordance with the geartooth system law, in which $\epsilon_a$ represents the profile overlap, $$\epsilon_{ges} = \epsilon_a + \epsilon_{62}$$

Because of the reduction of the support area 33 (see FIG. 4), the profile overlap for teeth 18' (and corresponding teeth 19' on the other synchronization gear) and for teeth 18" (and corresponding teeth on the other synchronization gear) is small compared with the overlap ratio which is given by $$\epsilon_\beta = \frac{b \cdot \sin\beta}{\pi \cdot m_n}$$

The width of the teeth is indicated by b, the angle of inclination by $\beta$, and the normal modulus by $m_n$. In accordance with the gear-tooth system law b, $\beta$ and $m_n$ must be selected such that $\epsilon_{ges}$ is greater than 1 and preferably is approximately 2.

Besides the already-mentioned cooling of the side chamber cover 21 from the outside by means of air, water or oil, it is also possible to directly cool the synchronization gears using a gas flow. FIG. 8 illustrates a crosssectional view of a Root's pump 1", the sectional plane of FIG. 8 being perpendicular to the sectional plane of FIG. 1A so that, in FIG. 8, only one of the two pistons (that is, piston 4) and only one of the two synchronization gears (that is, gear 17') are shown. In FIG. 8 gas, preferably air, is guided across a cooler 45 and is introduced into the side chamber 15 via a radial opening 46. The gas is exhausted on the opposite side (opening 47). Because the synchronization gears act in the manner of a gear wheel pump, sufficient flow-through of the side chamber 15 is assured.

FIG. 9 shows a Root's pump 1''' having an internal device for bathing in gas. The sectional plane in FIG. 9 is perpendicular to the sectional plane in FIG. 1A (as was the case in FIG. 8). The coolant gas is taken out of an outlet 48 of the Root's vacuum pump 1" by way of a conduit 49 and is introduced, by way of a cooler 45 and opening 46, into the side chamber 15. The air exiting through the opening 47 in the side chamber cover 21 is returned to an inlet 51 of the Root's pump 1''' via a conduit 50.

FIG. 9 shows an embodiment of a gas bath combined with a bypass line, known per se, in Root's pumps. The bypass valve is designated by 54. It automatically opens when the pressure difference between outlet and inlet pressure exceeds a set value, i.e. in cases of particularly high loads and therefore heat generation. In the exemplary embodiment shown increased cooling of the synchronization gears (17″ and another synchronization gear not shown in FIG. 9) starts at that time. So that cooling of the synchronization gears is assured even with the bypass valve 54 closed, a continuously open bypass 55 is associated with the valve 54 which assures that a minimal gas flow is maintained.

Returning to FIG. 8, a further or additional way to soften the first interaction shock will now be discussed. In FIG. 8 the synchronization gear 17′ (and possibly also the other synchronization gear of pump 1″, not illustrated in FIG. 8) has relatively elastic side areas (at least on the side of the beginning of the support area). To create such a property, the width of synchronization gear 17′ is setback—except for circumferential rims 52 and 53. This configuration additionally makes the synchronization gears less sensitive to deviations in the toothing or of the inclination angle of the teeth.

The present disclosure relates to the subject matter disclosed in European patent application 87103630.7 of Mar. 13th, 1987, the entire disclosure of which is incorporated herein by reference.

It will be understood that the above description of the present invention is susceptible to various modifications, changes and adaptations, and the same are intended to be comprehended within the meaning and range of equivalents of the appended claims.

What I claim is:

1. A double-shaft vacuum pump, comprising:
   a housing having a pump chamber and a side chamber;
   pistons which rotate without contact in the pump chamber; and
   a pair of synchronization gears in the side chamber, the synchronization gears being connected to respective pistons, the synchronization gears having teeth with profiles which are shaped so that contact of the tooth flanks is limited to the immediate vicinity of the pitch circle,
   wherein the teeth of at least one of the synchronization gears are truncated involute teeth and the effective tooth height above the pitch circle on said at least one of the synchronization gears ranges from one-hundredth to two-fifths of the modulus m, and
   wherein at least one of the teeth of said at least one of the synchronization gears has a flank with a support area adjacent its top land, and a flank profile which is set back from an involute shape at a region of the support area.

2. The pump of claim 1, wherein each synchronization gear has an axis and the teeth thereof are inclined at an angle $\beta$ with respect to a line parallel to the axis, the angle of inclination $\beta$ ranging from about 10° to 35°.

3. The pump of claim 2, wherein the angle of inclination $\beta$ is about 20°.

4. The pump of claim 1, wherein the synchronization gears have sides and elastic regions at the sides.

5. The pump of claim 4, wherein the sides of the synchronization gears are set back except for an annular rim which supports the teeth.

6. The pump of claim 1, further comprising means for cooling the synchronization gears.

7. The pump of claim 1, wherein the housing comprises a side chamber cover which encloses the side chamber, the side chamber cover having a wall with an approximately figure-8 configuration which conforms to the shape of the synchronization gears.

8. The pump of claim 7, further comprising a fluid cooling system connected to the cover.

9. The pump of claim 8, wherein the fluid is selected from the group consisting of air, water, and oil.

10. The pump of claim 7, further comprising bearing grease partially filling the side chamber.

11. The pump of claim 10, wherein said least one of the synchronization gears has a conical configuration, with the width of said at least one synchronization gear decreasing in the radial direction.

12. The pump of claim 10, wherein the teeth of said least one of the synchronization gears have a head surface with a leading edge and a trailing edge, the head surface being inclined so that the teeth have a greater height at the leading edge than at the trailing edge.

13. The pump of claim 10, further comprising seal means for dividing the side chamber into an inner region and an outer region in which the teeth of the synchronization gears are disposed, the grease being located in the outer region of the side chamber.

14. The pump of claim 13, wherein the synchronization gears have sides with grooves, and wherein the seal means comprises contact-free seals having edges which extend into the grooves.

15. The pump of claim 1, wherein the housing includes a side chamber cover which encloses the side chamber, the side chamber cover having a gas inlet opening and a gas outlet opening, and further comprising a gas cooling system for the synchronization gears, the gas cooling system including a gas line system connected to the gas inlet opening and a cooler in the gas line system.

16. The pump of claim 15, wherein the housing has a pump inlet and a pump outlet which communicate with the pump chamber, wherein the gas line system connects the cooler to the pump outlet, and further comprising means for connecting the outlet in the side chamber cover to the pump inlet.

17. The pump of claim 16, wherein the means for connecting the outlet in the side chamber cover to the pump inlet comprises a bypass line.

18. The pump of claim 17, wherein the means for connecting the outlet in the side chamber cover to the pump inlet further comprises a bypass valve, the bypass line bridging the bypass valve.

19. The pump of claim 1, wherein the side chamber does not contain lubricating oil or grease, and the synchronization gears are dry-running gears.

20. A double-shaft vacuum pump, comprising:
   a housing having a pump chamber and a side chamber;
   pistons which rotate with contact in the pump chamber; and
   a pair of synchronization gears in the side chamber, the synchronization gears being connected to respective pistons, the synchronization gears having teeth with profiles which are shaped so that contact of the tooth flanks is limited to the immediate vicinity of the pitch circle,
   wherein the teeth are truncated involute teeth having top lands that are positioned closely adjacent the pitch circle of the respective synchronization gear, so that the distance between the top land of a given tooth and the pitch circle of the synchronization gear from which the given tooth extends is less than about two fifths of the distance between the pitch circle and the base circle of the synchronization gear from which the given tooth extends, wherein the distance between the top land of the given tooth and the base circle of the other synchronization gear, at the closest approach of the top land of the given tooth to the base circle of the other synchronization gear as the synchronization gears rotate, is more than twice as great as the distance between the top land of the given tooth and the pitch circle of the synchronization gear from which the given tooth extends, and wherein a flank of the given tooth is rounded adjacent the top land of the given tooth to provide a profile setback from an involute shape.

21. The pump of claim 20, wherein the profile setback has a maximum value ranging from about 2 $\mu$m to about 10$\mu$m.

22. The pump of claim 21, wherein the maximum value of the profile set back is approximately 4$\mu$m.

* * * * *

UNITED STATES PATENT AND TRADEMARK OFFICE
CERTIFICATE OF CORRECTION

PATENT NO. : 5,035,590
DATED : July 30, 1991
INVENTOR(S) : Ralf Steffens

It is certified that error appears in the above-identified patent and that said Letters Patent is hereby corrected as shown below:

On the title page item [30], FOREIGN APPLICATION PRIORITY DATA
  "EP 87103" should read --EP 87103630.7--.

Signed and Sealed this

Twenty-second Day of December, 1992

Attest:

DOUGLAS B. COMER

*Attesting Officer*            Acting Commissioner of Patents and Trademarks